United States Patent [19]
Bourgeois

[11] Patent Number: 6,086,135
[45] Date of Patent: Jul. 11, 2000

[54] COVER FOR THE BOX OF A PICK-UP TRUCK

[76] Inventor: Maurice Bourgeois, 75 5e Boulevard, Terrasse-Vaudreuil, Québec, Canada, J7V 7B1

[21] Appl. No.: 09/174,671

[22] Filed: Oct. 19, 1998

[30] Foreign Application Priority Data

Nov. 6, 1997 [CA] Canada ................................ 2220639

[51] Int. Cl.$^7$ ................................................. B60P 7/02
[52] U.S. Cl. .................................. 296/100.1; 296/100.06
[58] Field of Search .............................. 296/107.01, 110, 296/174, 100.01, 100.02, 100.06, 100.17, 225, 100.07, 100.08, 100.1

[56] References Cited

U.S. PATENT DOCUMENTS 3,012,814   12/1961   Penner .
5,403,061   4/1995   Micknowicz .
5,632,522   5/1997   Gaitan et al. .

Primary Examiner—Joseph D. Pape
Assistant Examiner—Greg Blankenship

[57] ABSTRACT

A cover assembly for the box of a pick-up truck. The cover assembly has a rigid cover that is sized to fit between the side walls of the box when in the closed position closing the open top of the box. The assembly includes support ledges fastened to the inside of the side walls of the box for supporting the cover in the closed position. The support ledges carry female pivots spaced from the side walls to form gaps. The cover carries male pivots that enter the gaps in the closed position of the cover, the male pivots in a non-cooperating position with the female pivots. When the cover is lifted from either side of the box, the male pivot on the opposite of the box moves to cooperate with the female pivot on that side to form a longitudinal pivot about which the cover swings when opened.

18 Claims, 2 Drawing Sheets

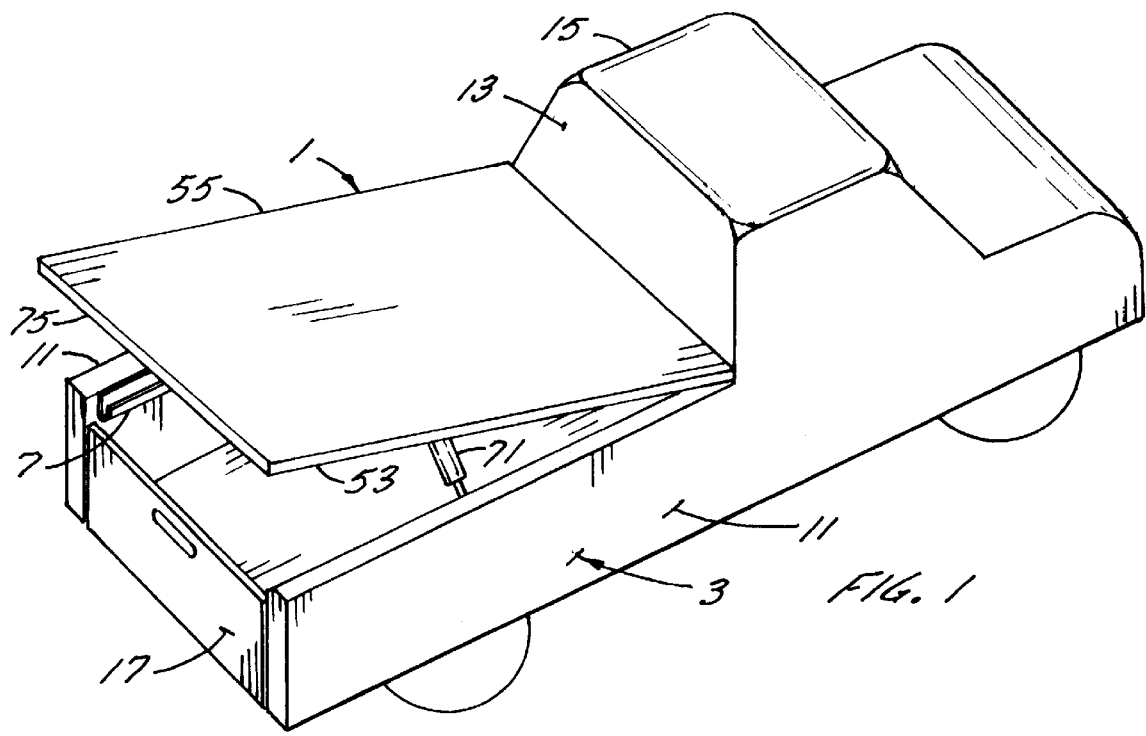
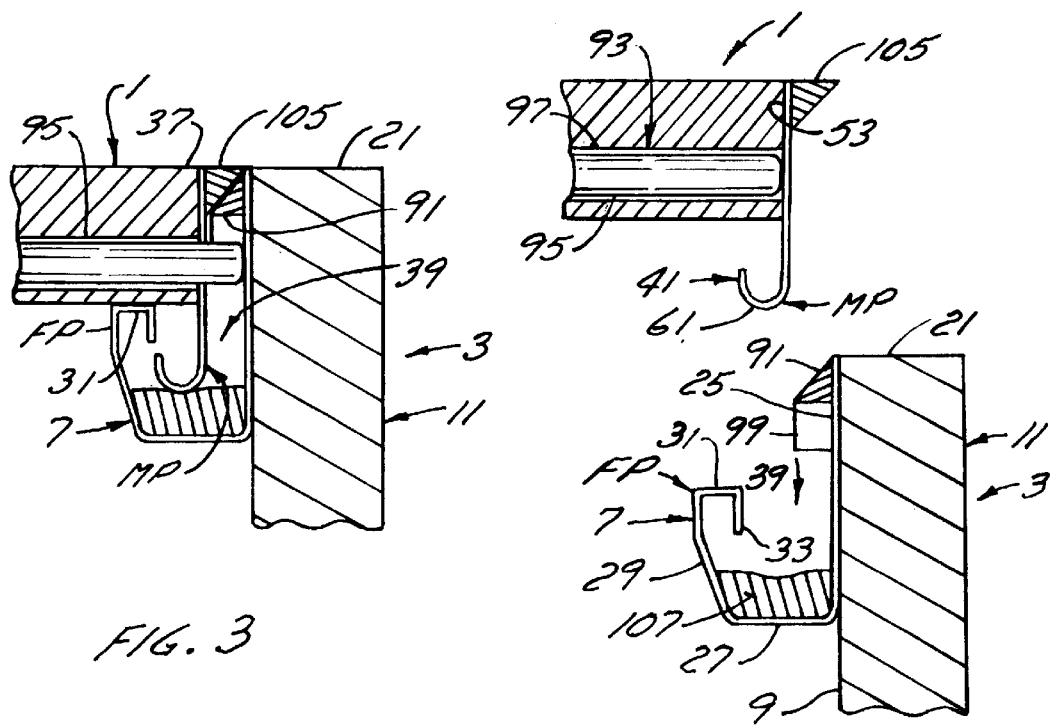

COVER FOR THE BOX OF A PICK-UP TRUCK

BACKGROUND OF THE INVENTION

1. Field of the Invention

This invention is directed toward a cover assembly for the box of a pick-up truck. The invention is more particularly directed toward a cover assembly for the box of a pick-up truck employing a rigid cover that can be mounted on the box in a manner so that the cover can be lifted to open the box from either side or from the back.

2. Description of the Related Art Including Information Disclosed Under CFR §§ 1.97–1.99

Rigid covers that close the open top of a box on a pick-up truck are known. U.S. Pat. No. 5,632,522, for example, discloses a rigid cover that opens up the box by lifting it up from the back. This cover is pivotally connected at the front to the back wall of the cab of the truck. The cover easily disconnects from the pivot connection allowing easy removal when required. However this cover cannot open from either side allowing easier access to the front part of the box. U.S. Pat. No. 3,012,814 shows a rigid cover that can be lifted from either side, and from the back of the box, and that is easily removable when required. However, the connections employed to attach the cover to the box are not very secure and the construction does not lend itself to being easily locked in place when closed. U.S. Pat. No. 5,403,061 discloses another rigid cover that can be lifted from either side but this cover requires selective removal of hinge pins depending on which side of the cover is to be opened and thus is awkward to use form either side.

SUMMARY OF THE INVENTION

It is the purpose of the present invention to provide a cover assembly for closing the back of a box on a pick-up truck, the assembly employing a rigid cover that can be easily mounted in place; that is easy to open from either side or from the back; that can be easily and securely locked when in the closed position; and that securely seals the box when in the closed position.

In accordance with the present invention, the cover assembly includes support ledges adapted to be mounted on at least the inside surfaces of the side walls of the box. The ledges support a rigid cover in the closed position between the side walls of the box. The support ledges carry female pivots. The cover carries male pivots, the male pivots in a non-cooperating position with the female pivots when the cover is in a closed position. When the cover is lifted from either side of the box, the male pivot on the opposite side of the box moves to cooperate with the female pivot on that side to form a longitudinal pivot about which the cover swings when opened.

With the male pivots in a non-cooperating position with the female pivots when the cover is closed, the cover can be easily removed from the box by lifting it straight up. movement of the male pivot on the opposite side of the cover to the side lifted to cooperate with the female pivot forms a long secure connection between the cover and the box through the support ledges. having the cover located between the side walls when in the closed position allows the cover to be easily locked.

The invention is particularly directed toward a cover assembly for the box of a pick-up truck, the box having side walls, a front wall formed by the back of the cab of the truck, and a tailgate. The cover assembly comprises a rigid cover sized to fit within the side walls of the box to close the open top of the box in the closed position of the cover. The assembly includes support ledges for supporting the cover in the closed position, at least one support ledge adapted to be mounted on the inner side of each side wall of the box. One of a male and female pivot is carried by each ledge. The other of the male and female pivot is carried by the bottom of the cover on each side. The male pivot on each side is in a non-cooperating position with the female pivot on that side when the cover is in the closed position. The male pivot is relatively movable to a cooperating position with the female pivot on one side of the cover when the other side of the cover is lifted to open the box, the male and female pivot in the cooperating position forming a longitudinal pivot about which the cover swings when lifted.

BRIEF DESCRIPTION OF THE DRAWINGS

FIG. 1 is a perspective view of the cover mounted on the box of a pick-up truck with its rear end raised;

FIG. 2 is a detail cross-section view taken along line 2—2 in FIG. 1;

FIG. 3 is a view similar to FIG. 2 but with the cover in the closed position;

DESCRIPTION OF THE PREFERRED EMBODIMENTS

Figure 4:
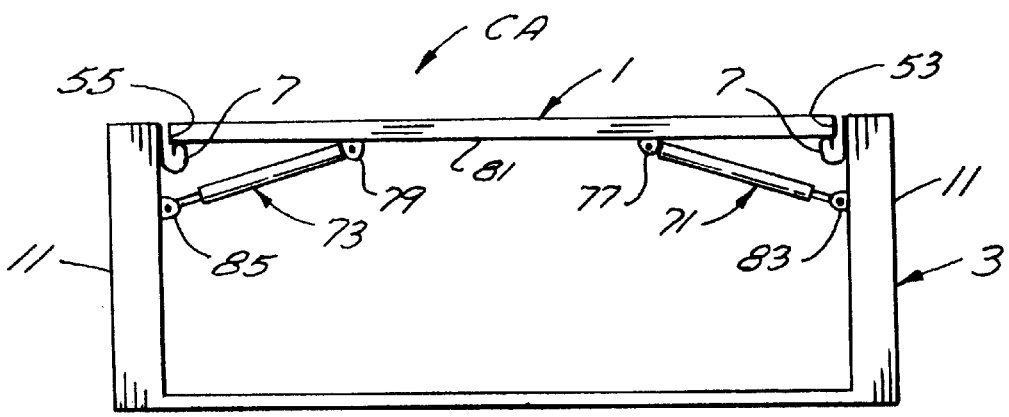
FIG. 4 is a cross-section of the box of the pick-up truck with the cover closed.

As shown in FIGS. 1 and 2, the cover assembly CA includes a rigid cover 1 which is rectangular in shape and sized to fit within the open top of the box 3 of a pick-up truck 5. The cover assembly CA also includes one or more lengths of support ledges 7, fastened to the inner, vertical, surfaces 9 of the side walls 11 defining the box 3 and also to the back wall 13 of the cab 15 of the truck. The support ledges 7 support the cover 1 horizontally, between the side walls 11 just within the top of the box 3 with the rear of the cover 1 adjacent the tailgate 17 of the box 3.

The support ledges 7, when mounted on the side walls 11, are horizontal and adjacent the top 21 of the side walls 11 and have a generally J-shaped cross-section as seen in FIG. 2. The support ledge (not shown) or ledges on the back wall 13 of the cab 15 are horizontally aligned with the ledges on the side walls 11. In more detail, each support ledge 7 has a main, vertical, wall section 25 and a female pivot FP spaced therefrom. A bottom wall section 27 extends transversely between the bottom of the main, wall section 25 and the bottom of the female pivot FP. The female pivot FP is in the form of a downwardly opening, outwardly facing, hook and comprises a secondary side wall section 29 extending upwardly and slightly outwardly from the inner end of the bottom wall section 27; a short horizontal wall section 31 extending inwardly from the secondary side wall section 29 toward the main, side wall section 25; and a short vertical end wall section 33 extending downwardly from the inner end of the horizontal wall section 31. The five wall sections 25, 27, 29, 31 and 33 are serially connected together and provide the generally J-shape of the cross-section of the support ledge 7.

The main wall section 25 of the ledge 7 is used to fasten the ledge lengths to both side walls 11 of the box 3 and also to the back wall 13 of the cab 15 of the truck by suitable fastening means (not shown). The lengths are all at the same height relative to the floor of the truck. Preferably the ledges are at a height where they will support the cover 1 horizontally flush with the top 21 of the side walls 11 of the box 3 as shown in FIG. 3. The top of the female pivot FP, or more specifically the horizontal wall section 31, forms a support for the cover 1. The horizontal wall sections 31 support the cover 1 so it's top surface 37 is flush with the top 21 of the side walls 11. The gap 39 between the main wall section 25 and the female pivot FP, or more specifically the end wall section 33 of the female pivot FP, provides entry for a male pivot MP on the cover 1 as will be described.

Male pivot members 41 are provided on the cover 1 and located on its front edge 51 and side edges 53, 55. The male pivot members 41 preferably includes lengths of side wall sections 59 fastened to the front and side edges 51, 53, 55 of the cover 1 by suitable fastening means (not shown) and extending down therefrom. A small, upwardly opening, inwardly facing, hooked-shaped wall section 61 is provided at the bottom of each side wall section 59 below the front and side edges of the cover. This curved wall section 61 forms the male pivot MP.

Small gas struts 71, 73 are fastened to the cover 1 and to the side walls 11 of the box 3, as shown in FIG. 4. The struts 71, 73 are located approximately mid-way between the front and back edges 51, 75 of the cover. One end of each strut 71, 73 is pivotally attached to a bracket 77, 79 on the bottom surface 81 of the cover 1 a short distance inwardly from the side edges 53, 55. The other end of each strut 71, 73 is pivotally attached to a bracket 83, 85 on the side walls 11 of the box 3 a short distance below the support ledges 7.

The ledges 7 carry abutments 91 which cooperate with locks 93 in the side edges 53, 55 of the cover 1 so the cover can be locked to the box 3 when it is flush with the top of the box. The abutments 91 are mounted on the top of the main wall section 25. The abutments 91 have a triangular cross-section, as seen in FIG. 2, and help guide the cover 1 into the closed position on the box when it is lowered. The locks 93 can comprise spring loaded pins 95 mounted within the cover 1 adjacent the edges 53, 55. Suitable known actuating means (not shown) are provided on the top of cover to operate the locks 93 to have the pins 95 project through openings 97 in the side edges of the cover and in the side wall sections 59 forming part of the male pivot members 41. When the pins 95 project from the cover 1 they are located just under the abutments 91 to lock the cover in place as shown in FIG. 3. The male pivot member on the front of the cover cooperates with the female pivot member on the support ledge mounted on the back of the cab to prevent longitudinal movement of the cover. If the cover is constructed to tilt up from either side only, and not from the back, so that the male pivot member on the front of the cover and the support ledge on the back of the cab are not used, pairs of tabs 99 (one shown) can be provided on the bottom of the abutments 91 between which each locking pin 95 is locked when in the locked position to prevent longitudinal movement of the cover relative to the box.

The edges 51, 53, 55 of the cover 1 can carry a resilient seal 105 of triangular cross-section that sits in the gap 39 against the abutments 91 to seal the gap 39 when the cover is closed. A further resilient seal 107 can be carried in the bottom of the J-shaped support ledges 7, on bottom wall section 27, against which the male pivot MP on the cover 1 bears to provide a further seal when the cover is closed.

In use, the cover 1 is normally mounted horizontally on the box 3 in a position to close the box with its bottom surface 81 resting on the horizontal wall 31 of the female pivot FP and its top surface 37 generally flush with the top surface 21 of the box side walls 11. The cover 1 is centered with respect to the opening defined by the ledges 7 on the side walls 11 and the back wall 13 of the cab 15. The male pivot MP is located in the gap 39 in the ledges 7 as shown in FIG. 3. The struts 71, 73 on the bottom surface 81 of the cover 1 are connected to the brackets 83, 85 on the side walls 11.

Figure 5A:
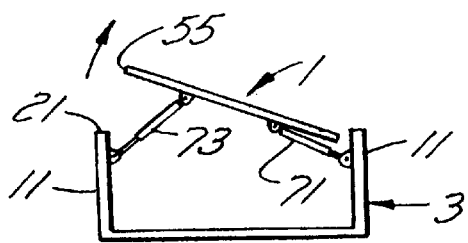
FIGS. 5A, 5B and 5C are schematic views showing the cover raised from various locations of the box.
Figure 6:
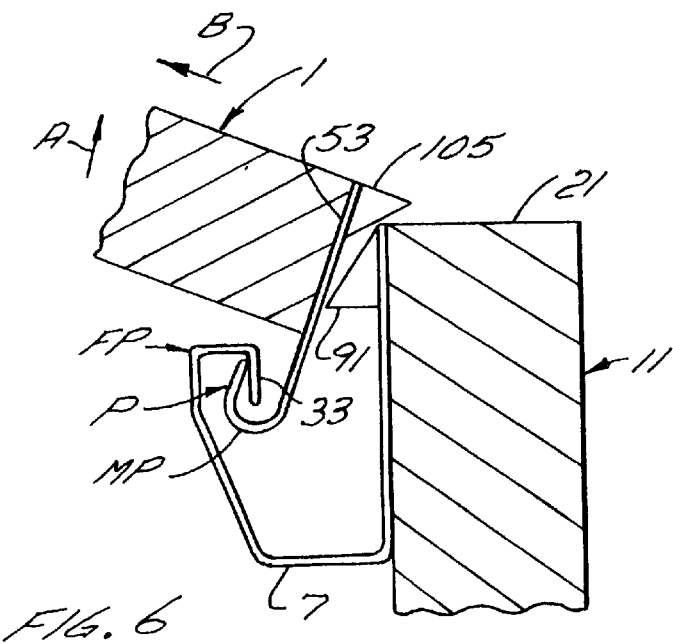
FIG. 6 is a detail cross-section view, similar to FIG. 2, showing the cover being lifted.

Once the cover 1 is installed on the box 3 through the struts 71, 73, it can be locked in place using the locks 93. The abutments 91 on the ledges 7 prevent the cover from being removed when the pins 95 of the locks 93 are extended. When access to the box 3 is desired, with the cover in place on the box, the operator can unlock the cover, withdrawing the pins 95 from the abutments, and lift one side of the cover or the other. As shown in FIG. 5A, if the left side 55 of the cover 1 is lifted, the left side strut 73 helps raise the left side of the cover. As the cover is being raised, as shown by the arrow A in FIG. 6, it also is moved to the left, as shown by the arrow B in FIG. 6. This movement is caused by the right side gas strut 71 pushing the cover to the left as soon as its left side 55 clears the top 21 of the side wall of the box. This movement to the left causes the male pivot MP on the right edge 53 of the cover 1 to slide past the female pivot FP on the right side ledge 7. Continued raising of the left side 55 of the cover causes the male pivot MP to engage in the female pivot FP on the ledge 7 and form a longitudinal pivot P along the right edge 53 of the cover allowing continued pivoting, opening, movement of the cover to an open position as shown in FIG. 5A. In the open position, the left side 55 of the cover 1 is raised sufficiently to allow access to the box 3 between the raised left side 55 of the cover and the top 21 of the left side wall 11. The strut 73 maintains the cover in the raised position.

Figure 5C:
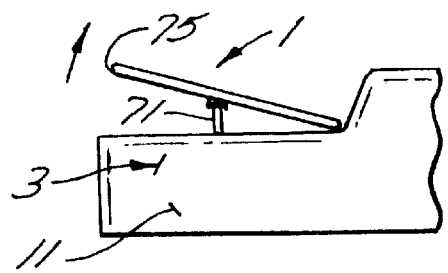
Figure 5B:
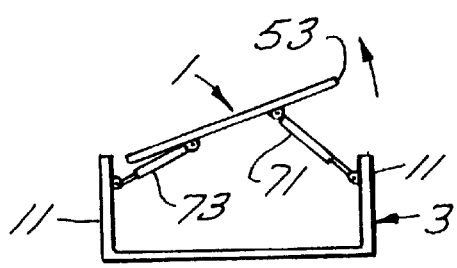

When the cover 1 is to be closed, lowering the left side 55 of the cover about the pivot P formed between the male MP and female FP pivot means, causes the cover to also slide slightly to right as it nears its closed position, the male pivot MP moving down and to the right away from the female pivot FP to lie within the gap 39 and disconnecting the pivot P. Operation of the locks can lock the cover in its closed position. The cover can be opened in a similar manner from the right side if desired, as shown in FIG. 5B, or from the back, as shown in FIG. 5C.

Handles (not shown) are provided on the top of the cover for manipulating the cover from either side or from the back. The cover is easily removed by lifting one side of the cover, disconnecting the gas strut on that side from the box, lowering the disconnected side of the cover, lifting the other side of the cover, disconnecting the gas strut on that side of the cover from the box, and then removing the cover from the box.

The gas strut connections provide enough movement so that when the cover is lifted from the back, the cover can also be pulled toward the back at the same time to engage the male and female pivots at the front of the cover.

The terms "vertical", "horizontal", "upwardly", "downwardly", "inwardly" and "outwardly" as employed in reference to the support ledges or parts thereof, and the male members, or parts thereof, are when the elements are installed on the truck.

I claim:

1. A cover assembly for a pick-up truck having a cab and a box defining an open top, the box having side walls, a front wall formed by the back of the cab of the truck, and a tailgate; the cover assembly comprising a rigid cover sized to fit within the side walls of the box to close the open top of the box in a closed position of the cover; the assembly including support ledges for supporting the cover in the closed position, at least one support ledge adapted to be mounted on the inner side of each side wall of the box; one of a male and female pivot carried by each ledge, the other of the male and female pivot carried by the bottom of the cover on each side thereof, the male pivot on each side being in a non-cooperating position with the female pivot on that side when the cover is in the closed position, the male pivot being relatively movable to a cooperating position with the female pivot on one side of the cover when the other side of the cover is lifted to open the box, the male and female pivot in the cooperating position forming a longitudinal pivot on the one side of the cover about which the cover swings when lifted.

2. A cover assembly as claimed in claim 1 wherein each female pivot is carried by a support ledge and each male pivot is carried by the cover.

3. A cover assembly as claimed in claim 2 wherein each support ledge has a main wall by means of which it is adapted to be mounted on the side walls, the female pivot being spaced from the main wall of the support ledge to provide an entry gap for the male pivot carried by the cover.

4. A cover assembly as claimed in claim 3 wherein the top of the female pivot supports the cover on each side.

5. A cover assembly as claimed in claim 4 wherein the female pivot comprises an outwardly facing, downwardly opening hook and the male pivot comprises an inwardly facing, upwardly opening hook, the hooks interengaging when in the cooperating position.

6. A cover assembly as claimed in claim 3 wherein the female pivot comprises an outwardly facing, downwardly opening hook and the male pivot comprises an inwardly facing, upwardly opening hook, the hooks interengaging when in the cooperating position.

7. A cover assembly as claimed in claim 1 including a gas strut on each side of the cover, the gas struts being aligned and one end of each strut being connected to the bottom of the cover at a point spaced inwardly of the side of the cover, the other end of the strut being adapted to be connected to the sidewall of the box, the gas strut on one side of the cover causing the cover to move when the other side of the cover is lifted to move the male pivot to its cooperating position.

8. A cover assembly as claimed in claim 5 including a gas strut on each side of the cover, the gas struts being aligned and one end of each strut being connected to the bottom of the cover at a point spaced inwardly of the side of the cover, the other end of the strut being adapted to be connected to the sidewall of the box, the gas strut on one side of the cover causing the cover to move when the other side of the cover is lifted to move the male pivot to its cooperating position.

9. A cover assembly as claimed in claim 6 including a gas strut on each side of the cover, the gas struts being aligned and one end of each strut being connected to the bottom of the cover at a point spaced inwardly of the side of the cover, the other end of the strut being adapted to be connected to the sidewall of the box, the gas strut on one side of the cover causing the cover to move when the other side of the cover is lifted to move the male pivot to its cooperating position.

10. A cover assembly as claimed in claim 4 including abutment means on the top of the main wall of the support ledge, and lock means on the cover for sliding under the abutment means when the cover is in the closed position.

11. A cover assembly as claimed in claim 10 wherein the abutment means has a downwardly and inwardly sloping top surface to help cam the cover to a central position within the box when moving to the closed position.

12. A cover assembly as claimed in claim 12 including seal means on the side of the cover cooperating with the top surface of the abutment means to seal the box with the cover in the closed position.

13. A cover assembly as claimed in claim 5 wherein the ledge member has a bottom wall connecting the main wall to the female pivot, a seal member is located on the bottom wall, and the hook of the male pivot abuts the seal member on the bottom wall when the male pivot is in the gap to seal the box when the cover is in the closed position.

14. A cover assembly as claimed in claim 1 including a front support ledge is adapted to be mounted on the front wall of the truck, the front, support ledge being aligned with the support ledges on the side walls of the box, and one of a male and female pivot being carried by the front support ledge, the other of the male and female pivot being carried by the bottom of a front position of the cover.

15. A cover assembly as claimed in claim 14 wherein the female pivot is carried by the front support ledge and the male pivot is carried by the cover.

16. A cover assembly as claimed in claim 15 wherein each front support ledge has a main wall by means of which it is adapted to be mounted on the cab, the female pivot being spaced from the main wall of the front support ledge to provide an entry gap for the male pivot carried by the cover.

17. A cover assembly as claimed in claim 16 wherein the top of the female pivot supports the front of the cover.

18. A cover assembly as claimed in claim 17 wherein the female pivot comprises an outwardly facing, downwardly opening hook and the male pivot comprises an inwardly facing, upwardly opening hook, the hooks interengaging when in the cooperating position.

* * * * *